United States Patent
Spilo

(10) Patent No.: US 6,182,165 B1
(45) Date of Patent: Jan. 30, 2001

(54) STAGGERED POLLING OF BUFFER DESCRIPTORS IN A BUFFER DESCRIPTOR RING DIRECT MEMORY ACCESS SYSTEM

(75) Inventor: David A. Spilo, Austin, TX (US)

(73) Assignee: Advanced Micro Devices, Inc., Sunnyvale, CA (US)

(*) Notice: Under 35 U.S.C. 154(b), the term of this patent shall be extended for 0 days.

(21) Appl. No.: 09/088,200

(22) Filed: Jun. 1, 1998

(51) Int. Cl.⁷ ................................................... G06F 13/14
(52) U.S. Cl. ............................ 710/22; 710/37; 710/220; 455/3.2; 455/12.1
(58) Field of Search ............................... 710/22, 37, 220; 455/3.2, 12.1

(56) References Cited

U.S. PATENT DOCUMENTS

| | | | |
|---|---|---|---|
| 4,598,363 | * 7/1986 | Clark et al. ............................. | 710/46 |
| 5,270,809 | * 12/1993 | Gammie et al. ........................ | 348/1 |
| 5,371,739 | * 12/1994 | Knapczyk ............................. | 370/449 |
| 5,448,702 | 9/1995 | Garcia et al. ........................ | 395/325 |
| 5,708,963 | * 1/1998 | Mobley et al. ........................ | 455/12.1 |
| 5,974,518 | * 10/1999 | Nogradi ............................... | 711/173 |
| 5,984,175 | * 11/1999 | Popp .................................... | 235/375 |

OTHER PUBLICATIONS

*Am186™ED/EDLV Microcontrollers User's Manual*, Advanced Micro Devices Corporation, ©1997, Chapter 8, pp. 1–8 and Chapter 9, pp. 1–14.

*Motorola's MC68302 Integrated Multi–protocol Processor Fact Sheet*, Motorola Corporation, ©1998.

*Am79C90 CMOS Local Area Network Controller For Ethernet (C–LANCE)*, Advanced Micro Devices Corporation, ©1998.

*MC68302 Integrated Multiprotocol Processor User's Manual*, Motorola Corporation, ©1995.

* cited by examiner

Primary Examiner—Thomas C. Lee
Assistant Examiner—Abdelmoniem Elamin
(74) Attorney, Agent, or Firm—Akin, Gump, Strauss, Hauer & Feld, LLP

(57) ABSTRACT

A microcontroller implements a buffer descriptor ring direct memory access (DMA) unit that polls buffer descriptors when in idle mode. This polling is to determine whether the software has set up a buffer or group of buffers transmission and transfer ownership of those buffers to the DMA unit. To reduce interrupt latency and bandwidth occupation, the polling of these buffer descriptor ownership flags is staggered for the DMA channels. For example, if eight DMA channels are implemented, the polling of their buffer descriptors can be distributed throughout a 1.28 millisecond polling interval.

16 Claims, 13 Drawing Sheets

STAGGERED POLLING OF BUFFER DESCRIPTORS IN A BUFFER DESCRIPTOR RING DIRECT MEMORY ACCESS SYSTEM

BACKGROUND OF THE INVENTION

1. Field of the Invention

The invention relates to microcontrollers, and more specifically to a microcontroller having an improved buffer descriptor ring DMA unit.

2. Description of the Related Art

Specialized microcontrollers with integrated communication features are becoming particularly attractive for communications applications. A microcontroller, or an embedded controller, is uniquely suited to combining functionality onto one monolithic semiconductor substrate (i.e. chip). By embedding various communication features within a single chip, a communications microcontroller may support a wide range of communication applications.

Microcontrollers have been used for many years in many applications. A number of these applications involve communications over electronic networks, such as telephone lines, computer networks, and local and wide area networks, in both digital and analog formats. In communications applications, a microcontroller generally has a number of integrated communications peripherals in addition to the execution unit. These can be low and high speed serial ports, as well as more sophisticated communications peripherals, such as a universal serial bus (USB) interface, and high level data link control (HDLC) channels.

Further, microcontrollers that are employed in communications applications typically include secondary peripherals that remove some of the burden of transferring data from the execution unit. For example, a direct memory access (DMA) controller can directly transfer data from memory to a communications port, and vice versa, with minimal processor intervention.

One such type of direct memory access controller is a buffer descriptor ring DMA controller. A circular buffer DMA controller is a DMA controller that allows for the transfer of data from a circular buffer in memory. A buffer descriptor ring DMA controller takes this concept a step further, providing a ring in memory of buffer descriptors, as opposed to simply a circular buffer itself. That is, a ring is maintained in memory of pointers to and control variables for buffers, also located in memory, which actually contain the data to be transferred. Buffer descriptor ring DMA is especially useful in communications applications that employ "packetized" data, such as network communications and ISDN and T1 data communications applications. Buffer descriptor ring DMA has been previously implemented. One example of such an implementation is the Am79C90C-LANCE (Local Area Network Controller for Ethernet) device by Advanced Micro Devices, Inc., of Sunnyvale, Calif. Using buffer descriptor ring DMA, software executed by the microcontroller can compose packets of data for transmission over a packet style communications network, and then commission the buffer descriptor ring DMA unit to send streams of packets with little or no processor intervention.

SUMMARY OF THE INVENTION

As part of a buffer descriptor ring DMA system, buffers, through their corresponding buffer descriptors, are either owned by software or by the DMA unit. Once the software is ready to relinquish control of the buffer to the DMA channel, it sets an ownership flag within the buffer descriptor, at which point the DMA channel then can transmit data using the buffer.

When the DMA unit needs the buffer, however, and the software owns it, the DMA unit periodically polls the ownership flag within the buffer descriptor until the software relinquishes ownership to the DMA unit by setting the ownership flag. When multiple channels are being polled, interrupt latency can be adversely affected due to a number of buffer descriptors being contiguously polled. Even more detrimental to interrupt latency is if multiple DMA transfers are simultaneously started. If they overlap, they can consume all available bus and memory bandwidth, thus preventing interrupts from being processed for an inordinate period. According to the invention, this is alleviated by distributing the polls of the buffer descriptors throughout a cycle of buffer descriptor polling. That is, the polling of ownership of buffer descriptors associated with multiple channels are evenly spread through the cycle, rather than being done all at once. This reduces interrupt latency because multiple buffer descriptors are not polled one after the other. Further, when two buffer descriptors' ownership are transferred to the DMA unit during the same polling cycle, this happens at different times during the polling cycle rather than simultaneously. This reduces overlap in DMA, both reducing interrupt latency and bandwidth consumption by the DMA unit.

BRIEF DESCRIPTION OF THE DRAWINGS

FIGS. 5A and 5B are illustrations of buffer descriptors and control registers implemented by the buffer descriptor ring DMA unit according to the invention;

DETAILED DESCRIPTION OF PREFERRED EMBODIMENT RELATED APPLICATIONS

The following related applications are hereby incorporated by reference:

Pending U.S. patent application Ser. No. 09/088,355, entitled PROGRAMMABLE ENTRY POINTS IN BUFFER DESCRIPTOR RING DIRECT MEMORY ACCESS SYSTEM, filed concurrently, by Bruce A. Loyer, Thai H. Pham, and David A. Spilo.

Pending U.S. patent application Ser. No. 09/088,478, entitled BUFFER LEVEL INTERRUPT MASKING IN BUFFER DESCRIPTOR RING DIRECT MEMORY ACCESS SYSTEM, filed concurrently, by Thai H. Pham and Patrick E. Maupin.

Microcontroller Overview

Figure 1A:
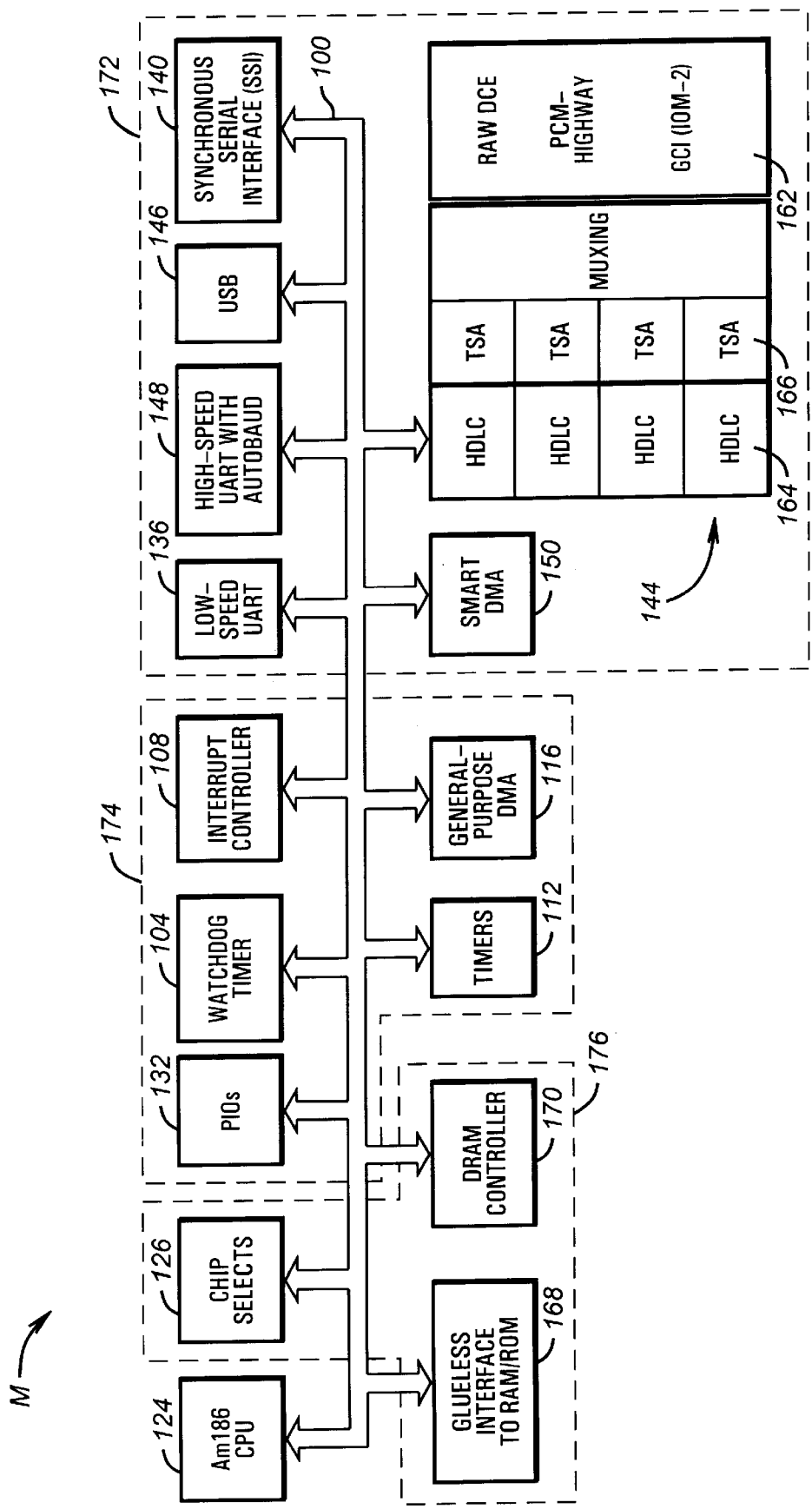
FIG. 1A is a block diagram of a typical microcontroller implemented according to the present invention.

Turning to FIG. 1A, shown is a block diagram of a typical microcontroller M implemented according to the invention. Such a microcontroller is preferably implemented on a single monolithic integrated circuit.

The microcontroller M preferably includes an internal bus 100 coupling, an execution unit 124, system peripherals 174, memory peripherals 176 and serial communication peripherals 172. The execution unit 124 in the disclosed embodiment is compatible with the AM186 instruction set implemented in a variety of microcontrollers from Advanced Micro Devices, Inc., of Sunnyvale, Calif. A variety of other execution units could be used instead of the execution unit 124. The system peripherals 174 include a watch dog timer (WDT) 104 for generating non-maskable interrupts (NMIs), microcontroller resets, and system resets. An interrupt controller 108 for supporting thirty-six maskable interrupt sources through the use of fifteen channels is also provided as a system peripheral. One disclosed system peripheral is a three channel timer control unit 112. The timer control unit 112 includes three 16-bit programmable timers. Another system peripheral is a general purpose direct memory access (DMA) unit 116 with four channels 0–3. The microcontroller M further supports user programmable input/output signal (PIOs). In the disclosed embodiment, forty-eight PIOs are provided.

The memory peripherals 176 of the disclosed microcontroller include a DRAM controller 170, a glueless interface 168 to a RAM or ROM, and a chip select unit 126. In the disclosed embodiment, the DRAM controller 170 is fully integrated into the microcontroller M. In the disclosed embodiment, the chip select unit 126 provides six chip select outputs for use with memory devices and eight chip select outputs for use with peripherals.

A low speed serial port implemented as a universal asynchronous receiver/transmitter (UART) 136 is provided as a serial communication peripheral. The low speed UART 136 is typically compatible with a standard 16550 UART known to the industry. Another serial communication peripheral in the disclosed embodiment is a synchronous serial interface (SSI) 140. Preferably the microcontroller M acts as a master in the synchronous serial interface 140, which is a standard synchronous serial channel.

The microcontroller M in the disclosed embodiment is particularly well suited to communications environments. To this end, the serial communication peripherals 172 of the micorcontroller M include a number of high speed communication controllers, including a High-level Data Link Control (HDLC) controller 144, a Universal Serial Bus (USB) controller 146, and a high speed serial port (HSUART) 148. The disclosed HDLC controller 144 provides four HDLC channels 164. The HDLC channels 164 and the USB controller 146 can be written to and read from by a "SmartDMA" unit 150, a unit which provides for chained buffers that are accessed via pairs of DMA channels. The SmartDMA unit 150 allows for a high degree of packetized transfer without excessive execution unit 124 intervention. The SmartDMA unit 150 preferably consists of four SmartDMA controllers, SmartDMA0-3, that each consists of a pair of DMA channels.

The HSUART 148 serves to form an asynchronous serial link across a bus to devices external to the microcontroller M. The asynchronous nature indicates that the HSUART 148 does not provide a separate clock signal to clock the data. Instead the rate at which data is sent and received must be predetermined or determined through autobauding and independently controlled on sending and receiving ends. This data rate is known as the baud rate. In accordance with the present invention, the HSUART 148 performs automatic baud detection with adjustment to a programmable baud rate as discussed below. It should be understood that the microcontroller M may include multiple HSUARTs 148. While a microcontroller is one potential device for providing an asynchronous receiver/transmitter in accordance with the present invention, an asynchronous receiver/transmitter may alternatively be provided independently or in connection with other devices. The nature of the particular device used in connection with an asynchronous receiver/transmitter is not critical to the present invention.

The disclosed HDLC controller 144 also includes an interface multiplexer 162. This multiplexer 162 couples the four HDLC channels 164, four time slot assignors (TSA) 166, and a number of external buses. Specifically, using the time slot assignors or otherwise, the HDLC channels 164 can be selectively coupled to a pulse code modulation (PCM) highway, a general circuit interface (GCI), an ISDN oriented modular interface revision 2 (IOM-2) serial bus, a data carrier equipment (DCE) serial interface, and other general and specific interfaces that often use packetized communication. Further, the HDLC channels 164 support HDLC, SDLC, Link Access Procedures Balanced (LAPB), Link Access Procedures on the D-channel (LAPD), and PPP, and as noted above, each include an independent time slot assignor 166 for assigning a portion of a serial frame to each HDLC for isochronous or isochronous-type communication.

Figure 1B:
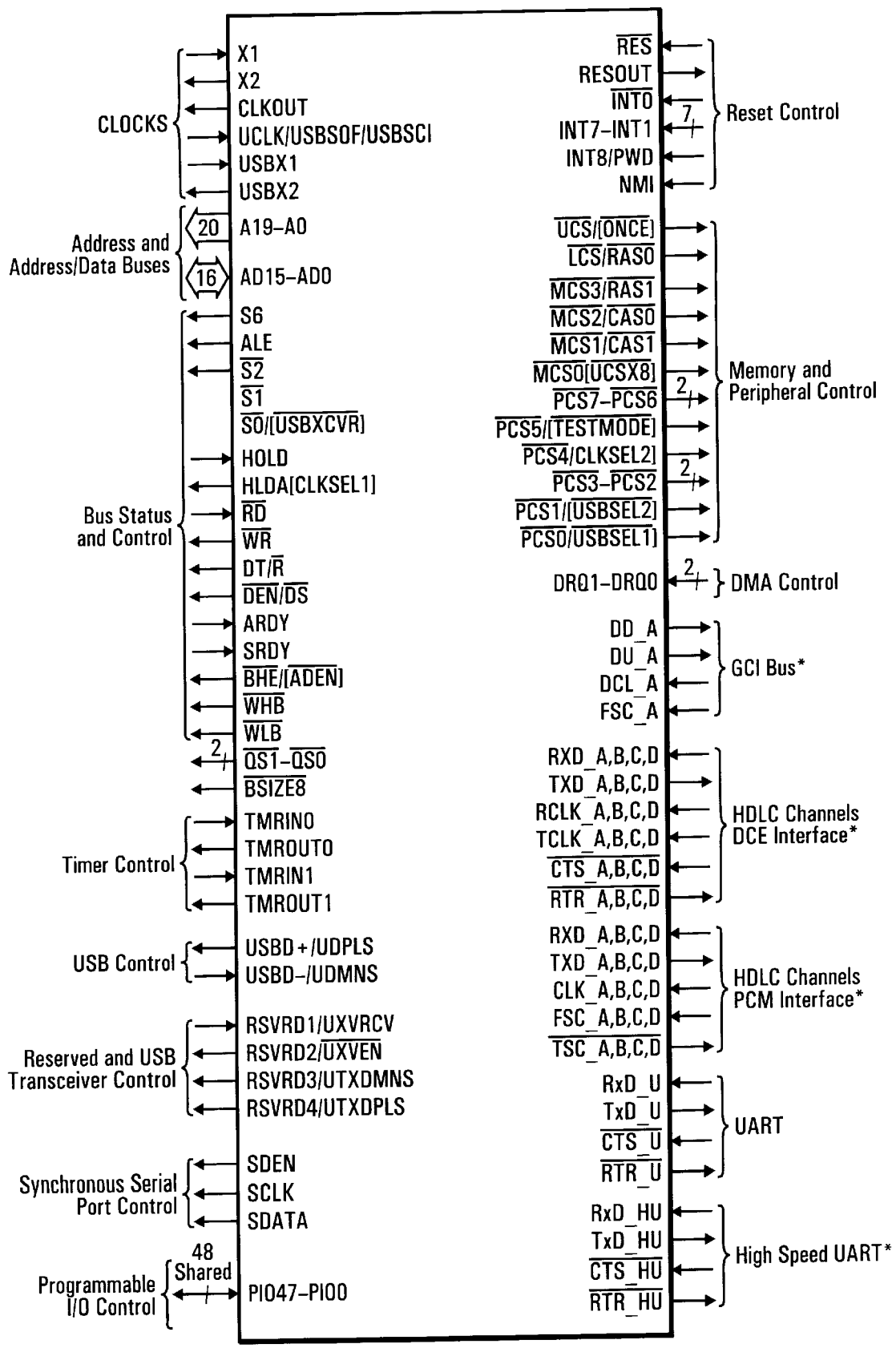
FIG. 1B is a schematic pinout diagram of the pinouts for the microcontroller of FIG. 1A.

Turning to FIG. 1B, shown are illustrative pinouts for the microcontroller M implemented according to the invention. Illustrated are clock pinouts for the clock 102, address and address/data bus pinouts to the bus interface unit 120, bus status and control pinouts, again generally for the bus interface unit 120, timer control pinouts coupled to the timer control unit 112, USB control and transceiver control pinouts for the USB controller 146, synchronous serial controller pinouts for the synchronous serial interface 140, programmable I/O pinouts for the programmable I/O unit 132, reset control pinouts, memory and peripheral control pinouts coupled to both the chip select unit 126 and the bus interface unit 120, DMA control pinouts for the general purpose DMA unit 116 and the SmartDMA unit 150, HDLC channel/DCE interface/PCM interface pinouts for coupling to the HDLC controller 144, UART pinouts for the low speed UART 136, and high speed UART pinouts for the HSUART 148. All of these pinouts, of course, are illustrative, and a wide variety of other functional units and associated pinouts could be used without detracting from the spirit of the invention. For example, a number of both the communications and general purpose peripherals from FIG. 1A could be eliminated, or added to, without detracting from the spirit of the invention.

The techniques and circuitry according to the invention could be applied to a wide variety of microcontrollers. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

The Buffer Descriptor Ring DMA Unit

Figure 2:
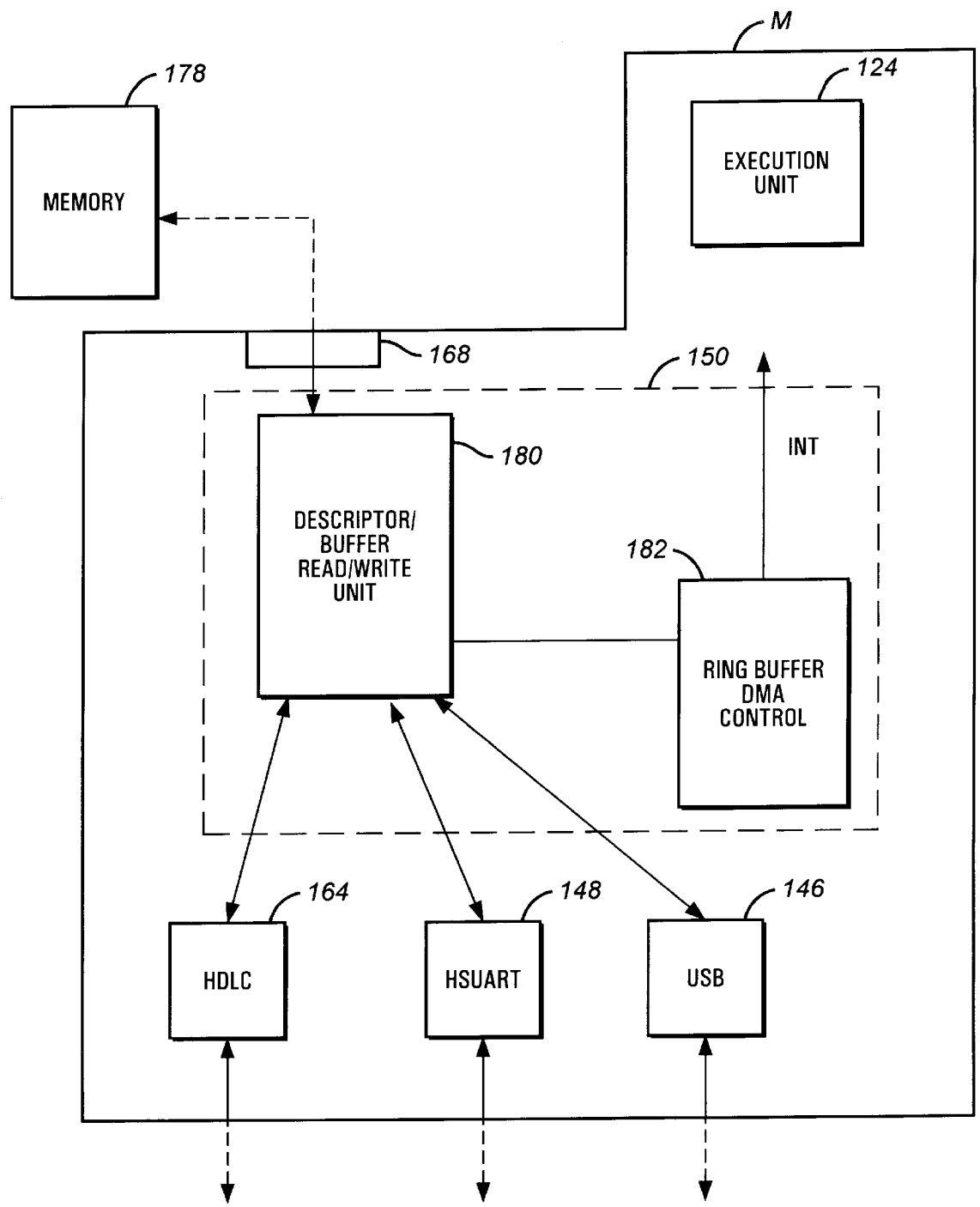
FIG. 2 is a block diagram illustrating the relationship between a buffer descriptor ring DMA unit, communications peripherals, and memory according to the invention.

Turning to FIG. 2, illustrated is a block diagram of the relationship between the SmartDMA, or buffer descriptor ring DMA, unit 150 to the execution unit 124, to the USB controller 146, to the high speed UART 148, to the HDLC channels 164, and to an external memory 178. In the disclosed embodiment, the SmartDMA unit 150 provides eight channels set up as four pairs of transmit and receive channels. Each of these channels points to a buffer descriptor ring within the memory 178, as is further described below in conjunction with FIGS. 3–4. The buffer descriptor ring contains a series of buffer descriptors, which in turn point to actual data buffers, also in the memory 178. The SmartDMA unit 150 accesses the buffer descriptor ring, and in turn the buffers, sequentially, either reading from or writing to those buffers in performing DMA with a source or destination, which could be the memory 178, the HDLC channels 164, the high speed UART 148, or the USB controller 146. This buffer descriptor ring architecture is generally compatible with the DMA controller found in the Am79C90 C-LANCE (Local Area Network Controller for Ethernet) integrated circuit by Advanced Micro Devices, Inc. of Sunnyvale, Calif. The buffer descriptor ring DMA unit 150 provides for transmission and reception of data across multiple memory buffers, reporting on status and providing control for the buffers in an execution unit 124 transparent or semi-transparent manner.

In the Smart DMA unit 150, shown are a descriptor/buffer read/write unit 180 and a buffer descriptor ring DMA control unit 182. The descriptor/buffer read/write unit 180 generally serves the purpose of reading from and writing to the memory 178 (here done through the RAM/ROM interface 168), and correspondingly transmitting the data to the DMA destination or source. Because the SmartDMA unit 150 employs buffer descriptor rings, the descriptor/buffer read/write unit 180 must access the memory 178 both for reading from and writing to buffer descriptors, and for reading from and writing to the buffers pointed to by those buffer descriptors.

The buffer descriptor ring DMA control unit 182 performs a variety of functions, including controlling the states of transmission and reception of DMA during buffer descriptor ring DMA, and maintaining information concerning the current buffer descriptor that is being used to access the current buffer for the channel. Further, a variety of other control functions are provided by the buffer descriptor ring DMA control unit 182, such as providing interrupts, polling buffer descriptor rings via the descriptor/buffer read/write unit 180, and arbitrating DMA access.

Figure 3:
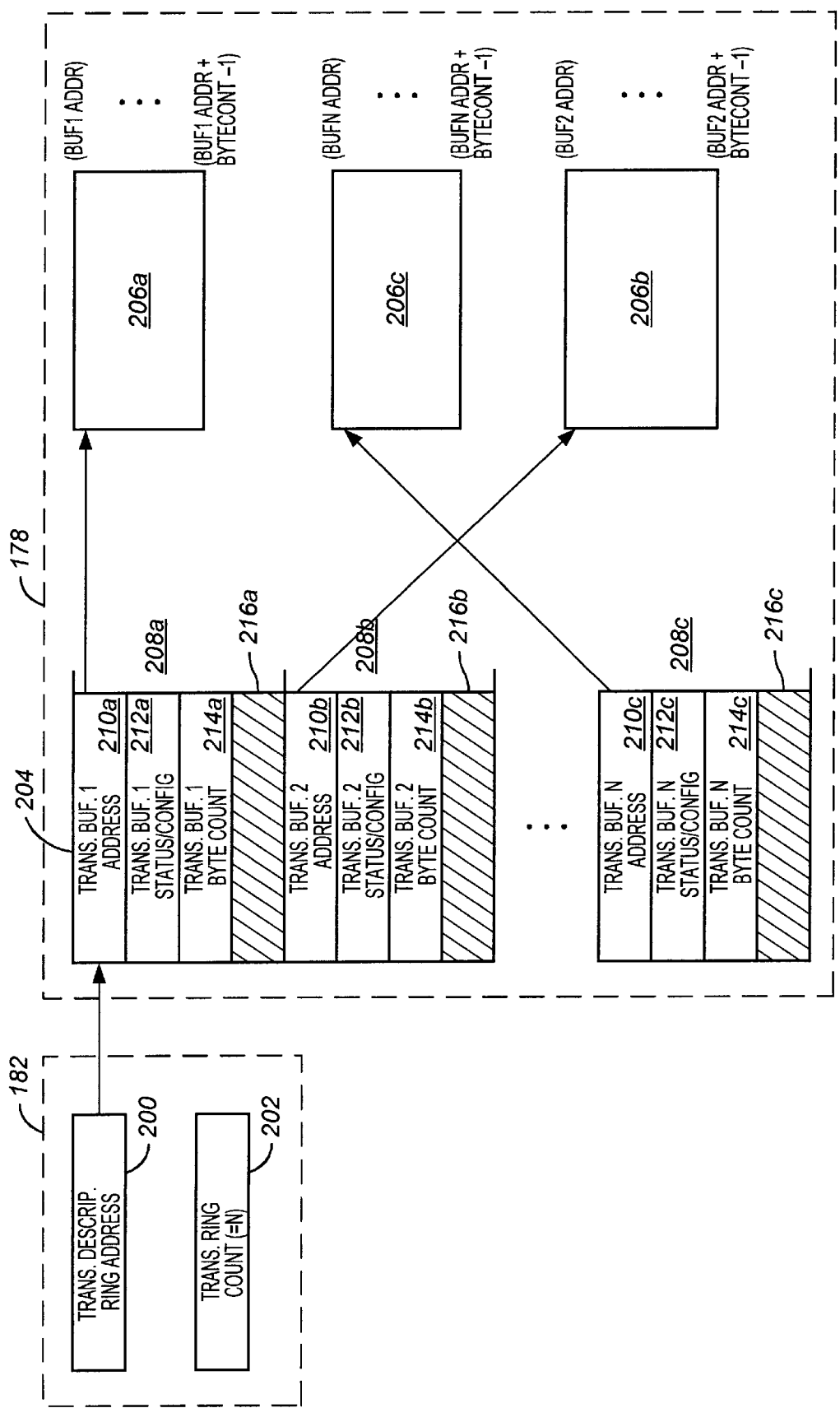
FIG. 3 is a block diagram illustrating memory data structures implemented by a buffer descriptor ring DMA unit according to the invention.

Turning to FIG. 3, illustrated is an overview of the data structures employed in the buffer descriptor ring DMA unit 150 according to the invention. FIG. 3 illustrates a single transmit channel of one of the four SmartDMA unit 150 channel pairs. The other channels operate in a similar manner, and a receive channel operates in a manner similar to a transmit channel. The transmit channel as illustrated in FIG. 3 includes a transmit descriptor ring address pointer 200 located within the buffer descriptor ring DMA control unit 182 and a transmit ring count 202, also located in the buffer descriptor ring control unit 182. The transmit descriptor ring address pointer 200 is a pointer to a location within the memory 178 that is the starting address of a buffer descriptor ring 204 employed by the illustrated SmartDMA unit 150 transmit channel. The transmit ring count 202 is a count of the number of buffer descriptors within that buffer descriptor ring 204 pointed to by the transmit descriptor ring address pointer 200.

Turning to the memory 178, a general overview is shown of the corresponding buffer descriptor ring 204 and buffers 206a–206c pointed to by the buffer descriptor ring 204. The buffer descriptor ring 204 is located at the address in memory 178 held in the transmit descriptor ring address 200. The buffer descriptor ring 204 illustrated includes a first descriptor 208a, a second descriptor 208b, and an Nth descriptor 208c. For clarity, the descriptors between the second descriptor 208b and the Nth descriptor 208c are omitted. Each descriptor 208 includes a transmit buffer address 210, transmit buffer status/configuration values 212, and a transmit buffer byte count 214. The transmit buffer address 210 is a pointer to another portion of the memory 178 that contains the corresponding transmit buffer 206 for a particular descriptor 208. For example, the descriptor 208a has a transmit buffer 1 address 210a which points to the transmit buffer 206a. The transmit buffer byte count 214 in turn defines the length of the transmit buffer 206. For example, the transmit buffer 1 byte count 214a indicates the length of the transmit buffer 206a. Finally, the transmit buffer status and configuration values 212 are used for control and status purposes during DMA using the corresponding transmit buffer 206, and are further discussed below in conjunction with FIG. 5.

Also shown are three unused portions 216. These portions 216 are unused in the transmit buffer descriptor ring 204, but would be used in a read buffer descriptor ring to provide error codes associated with a read buffer, such as frame, parity, overflow, underflow, and other errors.

Figure 4:
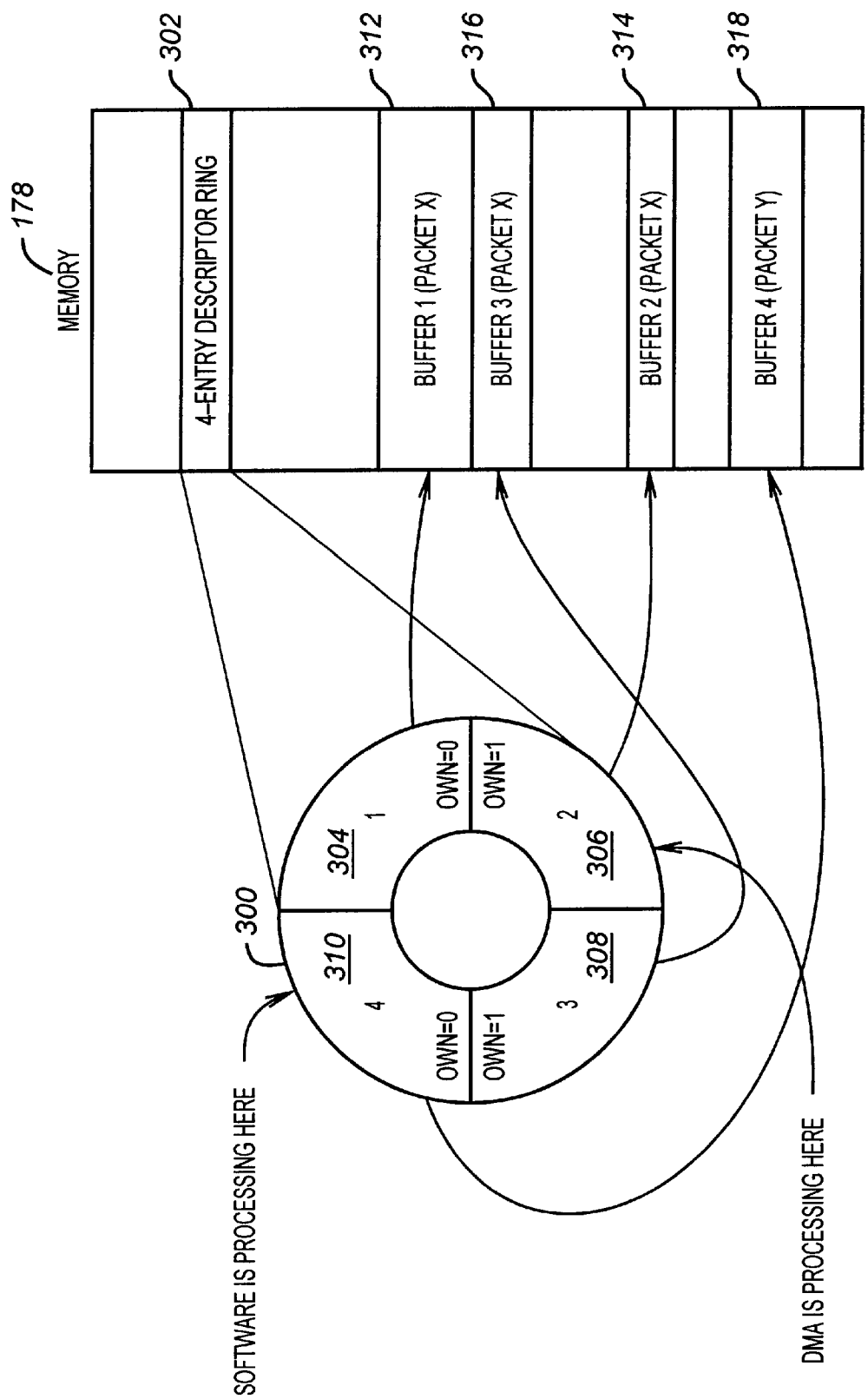
FIG. 4 is a block diagram illustrating the processing and ownership of buffer descriptors in a buffer descriptor ring DMA system according to the invention.

FIG. 4 is a block diagram illustrating further operational details of the buffer descriptor ring DMA of FIG. 3. In operation, the transmit buffer descriptor ring 204 of FIG. 3 is written to and read from by both the execution unit 124 and the descriptor/buffer read/write unit 180 of the Smart-DMA unit 150. For example, the execution unit 124 can set up the transmit channel illustrated in FIG. 3 by loading an appropriate transmit descriptor ring address 200 and a transmit ring count 202. The execution unit can then load buffers 206 with data for transmission, and set up the corresponding transmit buffer descriptors 208 to point to those transmit buffers 206. To allow the SmartDMA unit 150 to then access those buffers and transmit them without processor intervention, the execution unit 124 relinquishes "ownership" of the transmit buffer descriptors 208 and their corresponding buffers 206 by setting an ownership semaphore within the transmit buffer status/configuration values 212.

FIG. 4 illustrates processing employing a buffer descriptor ring 300 having four buffers. The four entry buffer descriptor ring 300 is held within the memory 178 at a location 302. The four descriptors 304, 306, 308, and 310 are circular in nature, with control passing from the fourth descriptor 310 to the first descriptor 304. The first and fourth descriptors 304 and 310 are shown with their ownership semaphore set to 0, which indicates they are "owned" by the execution unit 124, whereas the second and third descriptors 306 and 308 are illustrated with their ownership semaphore set to 1, such that they are "owned" by the SmartDMA unit 150. The first descriptor points to a first buffer 312, the second descriptor points to a second buffer 314, the third descriptor points to a third buffer 316, and the fourth descriptor points to a fourth buffer 318. In the illustrated four entry buffer descriptor ring 300, the software is shown as currently processing the fourth descriptor 310. This means that the software, which owns the fourth descriptor 310, can write data to the fourth buffer 318 for subsequent processing by the SmartDMA controller 150. Once it has loaded the fourth buffer 318, the software running on the execution unit 124 sets the ownership semaphore to 1, transferring it to the SmartDMA unit 150.

From the SmartDMA unit 150 side, the SmartDMA unit 150 has already processed the first buffer 312, which contains data for a first logical packet X. It is in the process of transmitting the second buffer 314, which contains additional data for the packet X, and once that is complete, will go to the third buffer 316 and transmit the final data for the packet X. Of note, after the SmartDMA unit 150 processed the first buffer 312, it set the ownership flag to 0 in the corresponding descriptor 304. That transferred ownership to the software running the execution unit 124, which can either load new data into the buffer 312, or simply change the descriptor 304 to point to a new buffer containing additional data for the packet Y. Once the SmartDMA unit 150 completes processing of the second buffer 314, it will set the ownership flag to 0 and proceed to the third buffer 316.

It is seen that the buffer descriptor ring illustrated in FIGS. 3 and 4 is particularly suitable for communications over serial channels that employ packetized data, such as USB, T1, HDLC, and the like. The execution unit 124 can compose the packets of data, store them in the memory 178, and then the set buffer descriptors 304–310 in the buffer descriptor ring 300 to point to those packets of data.

Figures 5A, 5B:
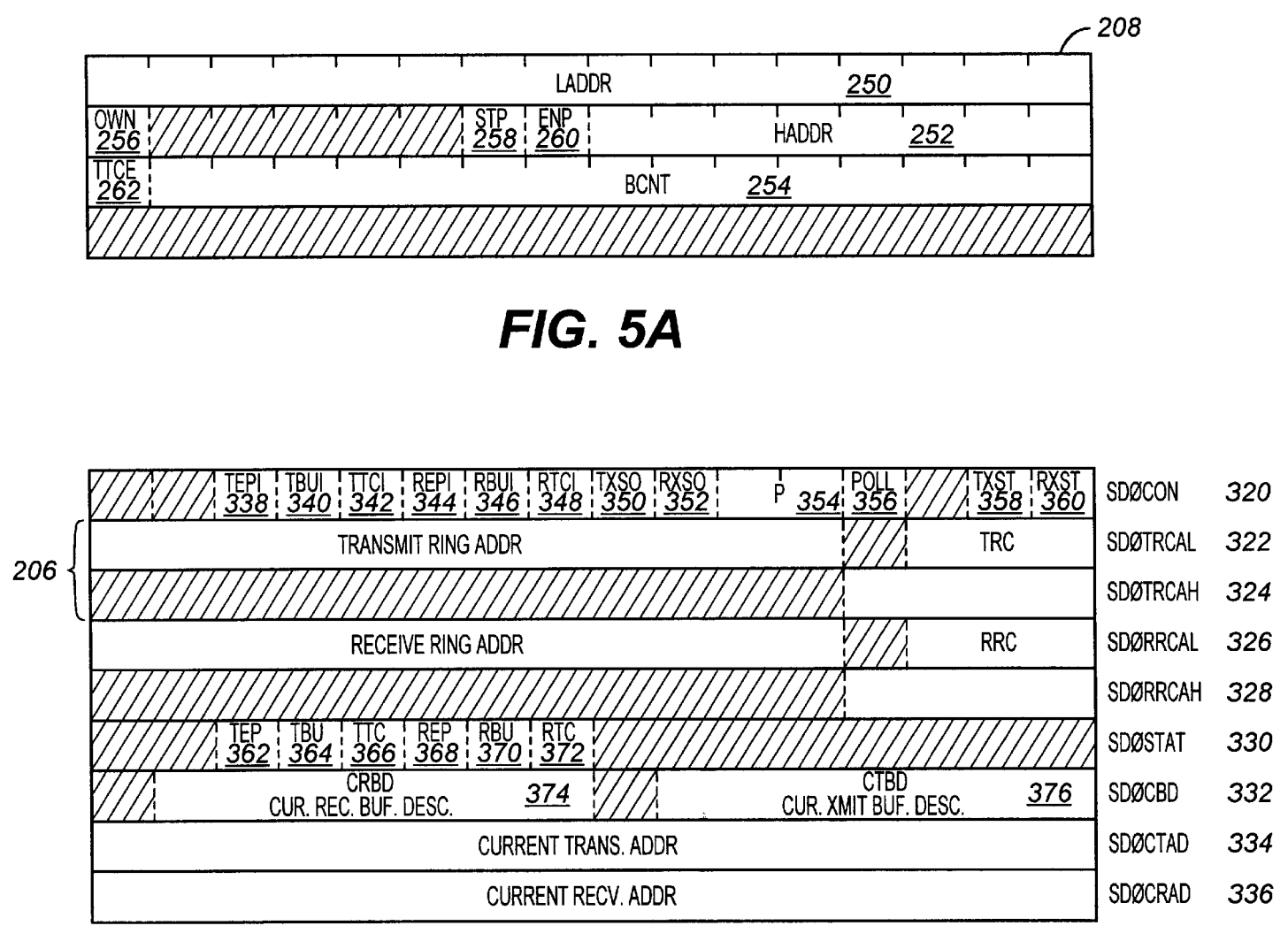

Turning to FIGS. 5A and 5B, illustrated are the detailed layouts of the transmit buffer descriptors 208 and the control registers within the SmartDMA unit 150. The transmit buffer descriptor 208 provides a 16-bit low order buffer address value LADDR 250 and a corresponding high order 8-bit value HDDR 252 which together form the transmit buffer address 210. The transmit buffer byte count 214 is actually a 15-bit byte count value BCNT 254, which is preferably stored in a twos-compliment format. The remaining used bits, of which there are four, form values for status and configuration of the buffer descriptor 208. An ownership flag OWN 256 allocates ownership to the software executed by the execution unit 124 when 0, and to the SmartDMA unit 150 when 1. As has been previously discussed, generally the software sets the OWN bit after filling a buffer 206 pointed to by the descriptor, and the SmartDMA unit 150 clears the OWN bit after transmitting the contents of the corresponding buffer 206. Neither the software nor the SmartDMA unit 150 can or should alter a buffer descriptor 208 after it has relinquished ownership.

A second value is a start of packet bit STP 258. This bit, when true, indicates that the corresponding buffer 206 is the first buffer to be used by the SmartDMA unit 150 for this packet of data. The STP bit 256 is employed for chaining buffers together and using multiple buffers 206 to transmit a single packet of data. The STP bit 256 must be set in the first buffer of the packet, or the SmartDMA unit 150 will skip the buffer descriptor 208 and poll the next descriptor until both the OWN value 256 and the STP value 258 are set.

An end of packet value ENP 260 correspondingly indicates the last buffer 206 to be used by the SmartDMA unit 150 for this packet. If both the STP value 258 and the ENP value 260 are set, the packet fits into a single buffer 206.

Finally, a transmit terminal count interrupt enable bit 262 provides for buffer-by-buffer interrupt control according to the invention. Historically, buffer descriptor ring DMA units provided for either enabling an interrupt on the end of transmission of each buffer, such as a buffer 206, or disabling such interrupts. According to the invention, however, the TTCE value 262, when 0, disabled interrupts upon completion of the corresponding buffer 206, while setting that value to 1 enables such an interrupt on completion of transmission of a corresponding buffer 206. This allows the SmartDMA unit 150 to be set up to provide interrupts on the end of some, but not all, buffers 206, and is further discussed below in conjunction with FIG. 7.

Receive buffer descriptors within a receive buffer descriptor ring are of a similar format, but further include error condition values for particular receive errors, such as framing errors, overflow errors, cyclic redundancy check errors, and buffer errors. The unused word 216 illustrated in FIG. 3 is also used in a receive buffer descriptor, providing a message byte count which is the length of bytes of the packet. This count may be less than the buffer byte count BCNT associated with the receive descriptor when a particular buffer holds the last data for a received packet. A receive buffer descriptor does include a RTCE bit for receive terminal count interrupt enable, and operates in a similar manner to the TTCE bit 262 in the transmit buffer descriptor 208.

Turning to FIG. 5B, shown are a number of registers employed by the SmartDMA unit 150 for control, status, and operation. Each pair of SmartDMA channels within the SmartDMA unit 150 includes its own set of such registers. Illustrated is the set of registers for the first pair of channels, pair 0. A SmartDMA control register SD0CON 320 sets up the receive and transmit channels for this SmartDMA channel pair. Two 16-bit registers SD0TRCAL 322 and SD0TRCAH 324 together hold the transmit descriptor ring address 200, previously discussed in conjunction with FIG. 3. Similarly, two 16-bit registers SD0RRCAL 326 and SD0RRCAH 328 together hold the receive buffer descriptor ring address.

Status information is updated by the SmartDMA unit 150 within a SmartDMA status register SD0STAT 330. A SmartDMA current buffer descriptor register SD0CDB 332 includes two values that both control and indicate the current buffer descriptor being used by channel pair 0 of the SmartDMA unit 150 for both the transmit channel and the receive channel. While the SD0CBD register 332 indicates the current buffer descriptor, the current location being used within the buffer pointed to by that descriptor is indicated in two registers, a current transmit address register SD0CTAD 334 and a current receive address register SD0CRAD 336. These are 16-bit registers, which are not large enough to individually address all available memory within the memory 178. As 16-bit registers, however, they are sufficient to uniquely address within a particular buffer, such as one of the transmit buffers 206. This limits the size of a transmit or receive buffer to 65,536 bytes, but that will generally be more than adequate to handle standard communications needs.

Returning to the SmartDMA control register SD0CON 320, this register contains a number of bits of interest. It provides three interrupt mask registers: a transmit end-of-packet interrupt bit TEPI 338, a transmit buffer unavailable interrupt bit TBUI 340, and a transmit terminal count interrupt bit TTCI 342. Referring back to the buffer descriptor ring DMA control unit 182 within the SmartDMA unit 150 (FIG. 2) as well as FIG. 1A which contains an interrupt controller 108, it is understood that the SmartDMA unit 150 provides an appropriate interrupt source to the interrupt controller 108. The interrupt controller 108 is preferably a standard interrupt controller, of which there are a variety, which is responsive to input signals from various sources to selectively provide interrupts to the execution unit 124. The implementation of an interrupt source within a peripheral device, as well as the interrupt controller 108, is well known to the art. Specifically referring to the SmartDMA control register SD0CON 320, these masks bits effectively enable and disable the passing of interrupt from the interrupt sources within the SmartDMA unit 150, here shown to be the buffer descriptor ring DMA control unit 182. But the exact location of implementation of the interrupt source within the SmartDMA unit 150 is not critical, as there are many techniques to provide interrupts responsive to certain conditions.

The transmit end-of-packet interrupt bit TEPI 338, when true, causes a SmartDMA unit 150 to generate an interrupt after transmitting the last byte of the current logical packet. Referring to FIG. 5A, if the current descriptor 208 has its end-of-packet value ENP 260 set, an end-of-packet interrupt will be generated on the completion of transmission of the corresponding buffer 206. If, however, the TEPI bit 338 is false, such an interrupt is masked. The transmit buffer unavailable interrupt bit TBUI 340, when set, indicates that during the transmission of a particular packet, the SmartDMA unit 150 has moved to the next buffer descriptor 208, but that buffer descriptor is not owned by the SmartDMA unit 150. That is, the OWN bit 256 of the next descriptor 208 is 0. Such an interrupt may be desirable to inform the software being executed that the current packet has not been seamlessly transmitted.

The transmit terminal count interrupt bit TTCI 342 is related to the TTCE bit 262 within the transmit buffer descriptor 208. Specifically, when the TTCI bit 342 is set, the SmartDMA unit 150 will provide an interrupt upon completion of transmission of the current buffer 206 pointed to by the buffer descriptor 208, but only if the transmit terminal count interrupt enable bit TTCE 262 is set in the corresponding buffer descriptor 208. Setting the TTCI bit 342 to 0 masks all terminal count interrupts on completion of transmission of a particular buffer 206 regardless of the setting of the TTCE bit 262 within the buffer descriptor 208. But by providing enablement and disablement of the transmit terminal count interrupt on a buffer descriptor 208 level, all, some, or none of the buffers 206 can cause an interrupt upon completion of transmission.

This is particularly helpful with small buffers 206. Rather than causing an interrupt after the completion of transmission of each buffer 206, for example, the software can program the SmartDMA 150, via the TTCE bits 262 within the buffer descriptors 208, to cause an interrupt on every third transmitted buffer 206, for example. This can reduce the interrupt overhead by an amount arbitrarily selected by the software designer.

The SmartDMA control register SD0CON 320 includes three corresponding receive buffer interrupt mask bits REPI 344, RBUI 346, and RTCI 348 that function in a manner similar to the TEPI bit 338, TBUI bit 340, and TTCI bit 342.

A transmit set OWN bit TXSO 350 within the SD0CON register 320 allows the SmartDMA unit 150 to control whether it clears the OWN bit 256 within the buffer descriptor 208 upon completion of transmission from a current buffer. This is often desirable, but sometimes not. For example, a ring of buffers can be set to continuously transmit a predetermined, perhaps idle, packet by setting the TXSO bit 350 to 1. The OWN bits 256 of the buffer descriptors 208 are then never cleared by the SmartDMA unit 150, and therefore the SmartDMA unit 150 will never stop at a buffer descriptor to wait for the OWN bit 256 to be set. A receive set OWN bit RXSO 352 operates in a similar manner.

Two relative priority bits P 354 indicate the priority of this channel relative to other channels during simultaneous transfer.

A forced poll bit POLL 356, when set to 1, forces the SmartDMA unit 150 to immediately poll the OWN bit 256 of the current buffer descriptor 208 to determine if that buffer 206 has been turned over to the SmartDMA unit 150. As is further discussed below in conjunction with FIGS. 10–12, when the four pairs of SmartDMA channels are enabled but currently not transmitting data, they remain "parked" on the current buffer descriptor within the transmit buffer descriptor rings. When the software needs to transmit data, the software loads a corresponding transmit buffer 206 with that data, loads that data into the transmit buffer address 210 of the current buffer descriptor 208, and then sets the OWN bit 256 to 1, allowing the SmartDMA unit 150 to begin to transmit that buffer 206. But the SmartDMA unit 150 does not continuously read the transmit buffer status/configuration register 212 within the current buffer descriptor 208 to determine the status of the OWN bit 256, as that would consume excessive bandwidth. The SmartDMA unit 150 instead periodically polls that OWN bit 256. By providing the forced poll bit POLL 356, the software can force the SmartDMA unit 150 to immediately poll the current buffer descriptor 208, and thus immediately start transmission, once the software has set up a buffer 206 for transmission.

A start/stop SmartDMA transmit channel bit TXST 358 and a start/stop SmartDMA receive channel bit RXST 360 enable and disable the transmit and receive channels for the current channel pair of the SmartDMA unit 150.

The SD0TRCAL register 322 contains the 12 low order bits of the transmit descriptor ring address 200, but also includes three transmit ring count bits TRC that encode for the number of entries in the transmit buffer descriptor ring 204. That is, this 3-bit value represents the value of the transmit ring count 202 as an exponent of 2, thus representing values from 1 through 128 in powers of 2. The SD0RRCAL register 326 is similarly configured.

The SmartDMA status register SD0STAT 330 provides a number of status bits. These bits can be read by the execution unit 124 to determine the source of a particular interrupt. A transmit end-of-packet bit TEP 362 is true when the last byte of a packet has been transmitted successfully by the transmitter (which would correspondingly cause a transmit end-of-packet interrupt if the TEPI bit 338 is set true in the SD0CON register 320). A transmit buffer unavailable bit TBU 364 similarly indicates a transmit buffer is not available, corresponding to the transmit buffer unavailable interrupt if the TBUI bit 340 is set. A transmit terminal count bit TTC 366 is true if the last byte of the current buffer 206 has been transmitted and the buffer released. As previously discussed, interrupts corresponding to this event are affected by both the TTCI bit 342 within the SD0CON register 320 and the TTCE bit 262 within the transmit buffer descriptor 208. Three corresponding bits are implemented for a receive buffer ring, a receive end-of-packet bit REP 368, a receive buffer unavailable bit RBU 370, and a receive terminal count bit RTC 372.

The SD0CBD register 332 contains a current receive buffer descriptor value CRBD 374 and a current transmit buffer descriptor value CTBD 376. Writing to these fields causes the SmartDMA channel to change the current descriptor to the newly written descriptor value, but the receive and transmit channel enable bits TXST 358 or RXST 360 must first be cleared before writing to the corresponding CRBD value 374 or CTBD value 376. Both the CRBD field 374 and the CTBD field 376 roll over once the number of buffers indicated by the TRC value or the RRC values are exceeded.

Figure 6:
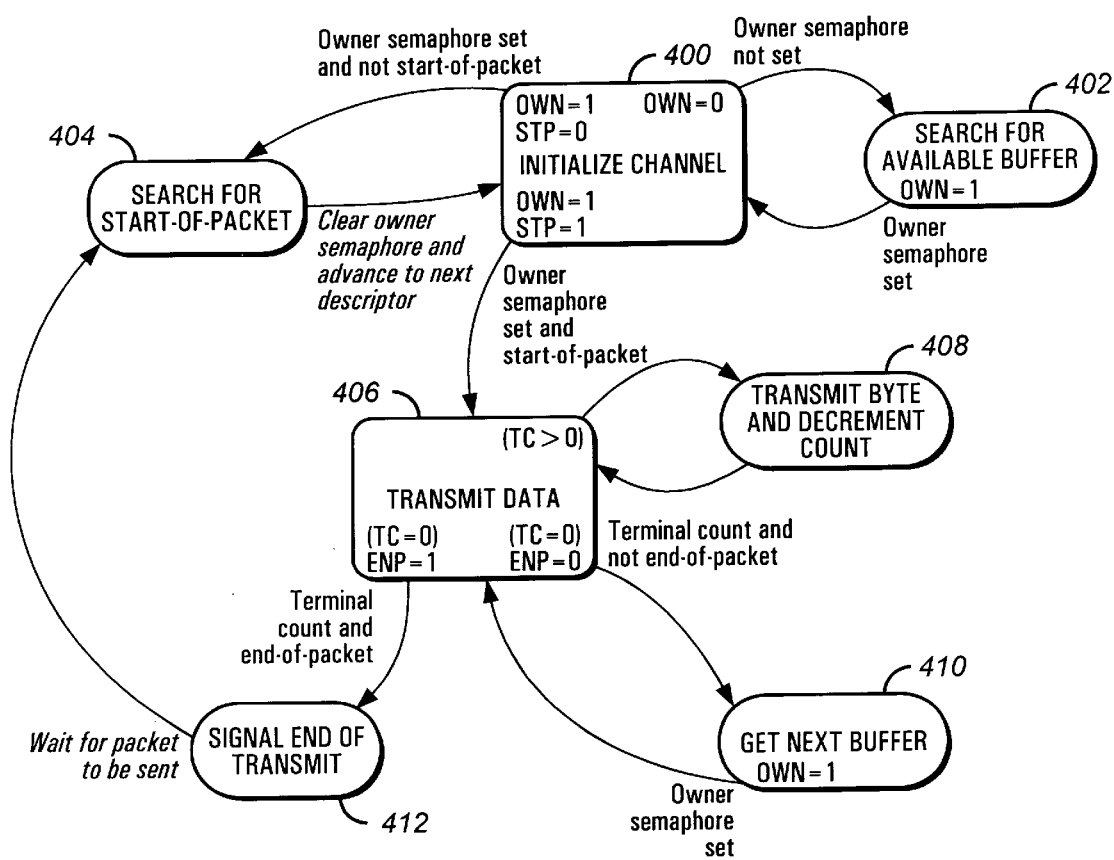
FIG. 6 is a state diagram for a transmit channel in the buffer descriptor ring DMA unit according to the invention.

Turning to FIG. 6, illustrated is a SmartDMA unit 150 transmit channel flow diagram. Beginning at state 400, the SmartDMA unit 150 enters an initialization mode when the transmit channel is first enabled by setting the TXST bit 358 within the SD0CON register 320. The transmit channel reads the current transmit buffer descriptor 208 and determines if it is the owner (because the OWN bit 256 is set). If the OWN bit 256 is not set, control proceeds to a search for available buffer state 402, where the OWN bit 256 of the current buffer 208 is periodically polled to determine if it has been set to 1, indicating that software has a relinquished control to the SmartDMA unit 150. When this happens, control then passes back to the initialize channel state 400, and then to the either a search for start-of-packet state 404 or a transmit data state 406, depending on whether the start-of-packet bit STP 258 is correspondingly set. If the OWN bit 256 and the start-of-packet bit STP 258 are set, control proceeds to the transmit data state 406, because current buffer descriptor 208 is owned by the SmartDMA unit 150 and is the start of a packet.

If the OWN bit 256 is set and the STP bit 258 is cleared, however, control proceeds to the search for start-of-packet state 404, where the OWN bit is reset (if the transmit set own bit TXSO 350 is set in the control register SD0CON 320) and the SmartDMA unit 150 advances to the next descriptor (by incrementing the current transmit buffer descriptor count CTBD 376) and returns to the initialize channel state 400.

When the OWN bit 256 and the STP bit 258 are both set within the current buffer descriptor 208, then the SmartDMA unit 150 is both the owner of the current buffer descriptor and that buffer descriptor 208 points to the start of a packet, so control proceeds to the transmit data state 406. In the transmit data state 406, the address of the buffer 206 associated with this buffer descriptor 208 is read from the descriptor 208 (the LADR 250 and the HADR 252 bits) into the ST0CTAD register 334. Further, the transmit channel reads the length of the corresponding buffer 206 from the current buffer descriptor 208 by reading the BCNT value 254 and programs that value into an internal terminal count register. The transmit channel then begins transmitting by transmitting one byte of data from the buffer 206 to the destination device for every DMA request. After each transfer, the source address in the SD0CTAD register 334 is incremented and the internal transfer count is decremented. This all occurs in a transmit byte and decrement count state 408. Once the terminal count reaches 0, if the end-of-packet bit ENP 260 is 0, indicating additional buffers are required for transmission of this packet, control proceeds to the get next buffer state 410, where the transmit channel attempts to acquire the next buffer 206 pointed to by the next buffer descriptor 208. If the OWN bit 256 in the next buffer descriptor 208 is 0, the software owns the descriptor, so the transmit channel periodically polls the buffer descriptor 208 until the OWN bit 256 becomes 1.

If an error condition occurs before the transmit channel acquires the next descriptor 208 (i.e., before the OWN bit 256 becomes 1), the error causes the requesting transmit source to shut down and the SmartDMA unit 150 to be reprogrammed. Specifically, an error would occur if an additional DMA request occurred before the transmit channel acquired the next buffer 206, causing a data underflow. Historically, such an error would cause the transmit channel to simply attempt to find the next packet within the buffer descriptor ring 204. According to the invention, however, such an error causes the transmit channel to be disabled (typically by software, but possibly by hardware, the TXST bit 358 is set to 0 within the SD0CON register 320), allowing the current transmit buffer descriptor address 376 to be reprogrammed. This is further discussed below in conjunction with FIGS. 8 and 9, but in general allows the current packet to be retransmitted on such an error.

Assuming the transmit channel does obtain the next buffer 206 by the OWN bit 256 going high, control proceeds from the get next buffer state 410 back to the transmit data state 406, where excursions between the transmit data state 406, the transmit byte and decrement count state 408, and the get next buffer state 410 are repeated until the transmit count becomes 0 and the end-of-packet bit ENP 260 for the current descriptor 208 is 1. At that point, the current packet has been completely transmitted, so control proceeds to a signal end-of-transmit state 412, where the transmit channel signals the end of the packet to the destination device by asserting an internal signal, waits for the indication from that device that the transmitted packet has been successfully received, advances to the next buffer descriptor 208 within the transmit buffer descriptor ring 204, and moves to the search for start of packet state 404.

After each buffer is transmitted, the ownership flag for the descriptor 208 for that particular buffer 206 is released to the software unless the TXSO bit 350 and the SD0CON register 320 is set.

It will be appreciated the receive buffer channel operates in a similar manner, although it further provides for errors on received data.

Buffer Level Interrupts

Figure 7:
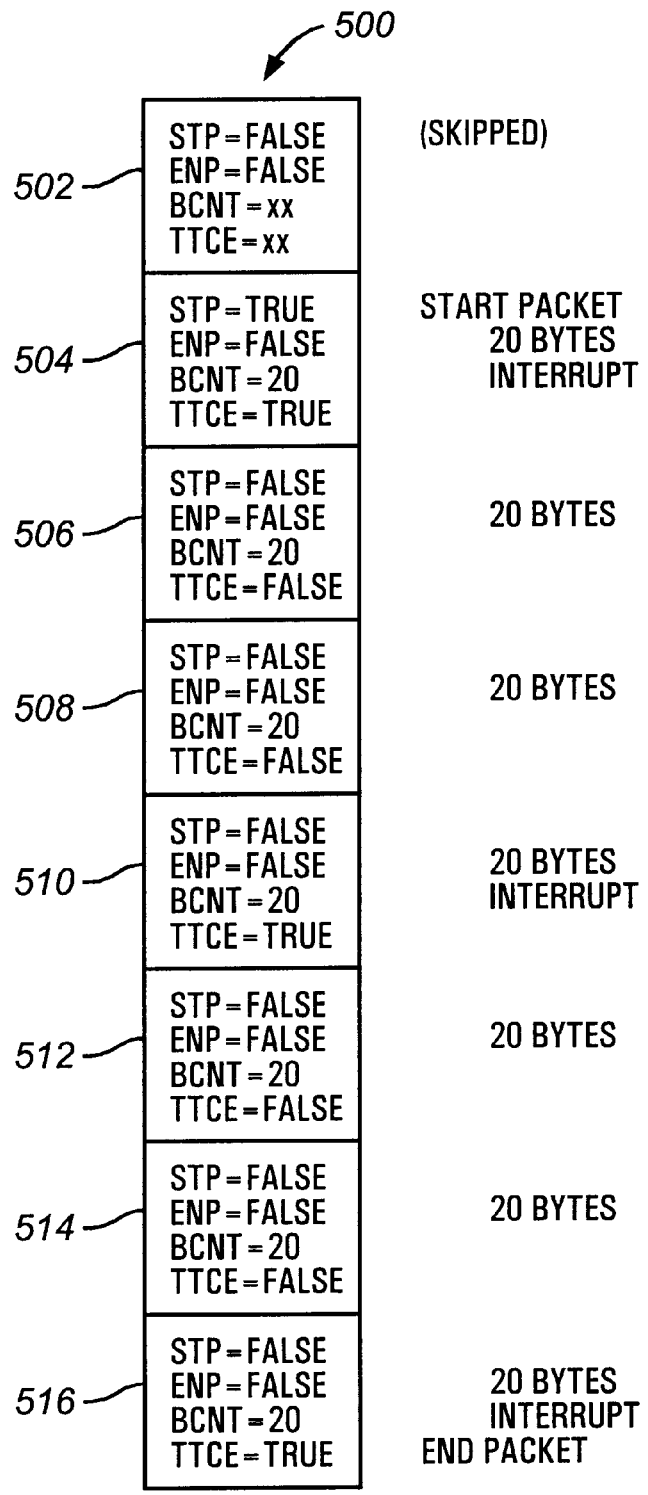
FIG. 7 is a memory diagram illustrating the buffer level interrupt control in the buffer descriptor ring DMA unit according to the invention.

Turning to FIG. 7, shown is a buffer descriptor chain 500 that illustrates the ability to selectively provide the end of buffer (or transmit terminal count) interrupt, on a buffer-by-buffer basis. This ability can be useful to reduce the frequency of interrupts, for example, while ensuring there are always buffer descriptors and corresponding buffers available for the SmartDMA unit 150. For example, rather than providing for an interrupt at the end of each buffer 206, the software can set up a transmit buffer descriptor ring 500 where interrupts occur every third buffer. In any case, turning to FIG. 7, shown are eight transmit buffer descriptors 502–516. As the SmartDMA unit 150 processes these descriptors, it first processes the transmit buffer descriptor 502, whose start of packet bit STP 258 and end of packet bit ENP 260 are both false, so the transmit channel proceeds to the transmit buffer descriptor 504.

The transmit buffer descriptor 504 points to the first buffer of a packet, because the STP bit 258 is true and the ENP bit 260 is false. Here, as for the remainder of the buffers, it is assumed that the byte count BCNT 254 for each buffer 206 is 20. After the 20 bytes of the buffer 206 are transmitted, a transmit terminal count interrupt is generated because the transmit terminal count interrupt enable bit TTCE 262 for the transmit buffer descriptor 504 is true. (This assumes that the TTCI bit 342 in the SD0CON register 320 is also true, enabling this type of interrupt.)

The software then proceeds to the next transmit buffer descriptor 506, which is a middle buffer for the current packet because the STP bit 258 and the ENP bit 260 are both false. In this case, after the 20 bytes of the corresponding buffer 206 are transmitted, no transmit on terminal count interrupt is generated because the TTCE bit 262 is false. Instead, the transmit channel releases this buffer descriptor 506 (by resetting the OWN bit 256) and proceeds to the next buffer descriptor 508. Here again, after the 20 bytes are transmitted, no interrupt is generated because the TTCE bit 262 is again false. Control proceeds to the next transmit buffer descriptor 510, but this time after completion of the buffer a transmit on terminal count interrupt is generated because the TTCE bit 262 is true.

Control then proceeds through the next two transmit buffer descriptors 512 and 514, neither of which generate an interrupt because their TTCE bit 262 is false. Finally, control proceeds to the transmit buffer descriptor 516, which is the last buffer for the current packet as indicated by the ENP bit 260 being true. After this packet is transmitted, an interrupt will be generated because the TTCE bit 262 is true, but even if it were false, it will an interrupt would be generated if the transmit on end-of-packet interrupts were enabled by setting the TEPI bit 338 within the control register SD0CON 320. That is, either of these could provide the source of the interrupt for the last packet.

In FIG. 7, only the completion of transmission of every third buffer generated an interrupt. This could of course be varied depending on the needs of the circumstance, but rather than providing a "all or nothing" approach, greater flexibility is created for the interrupt generation in the chain buffers.

As an example, a DMA transfer could include a chain of 64 buffers, each containing 32 bytes. Without implementing the buffer-by-buffer end-of-buffer interrupt buffer control, either 64 interrupts would be generated during the course of the transfer, or none. Instead, any desired number of interrupts can occur during this chain by setting a corresponding number of the TTCE bits 262 true or false among the 64 transmit buffer descriptors, in consideration of the buffer size and the data processing rate.

This technique is equally applicable to receive buffer descriptor rings. By only providing interrupts on some of the receive buffers, overall interrupt servicing can be reduced while maintaining any level of desired control.

Programmable Entry Points

Figure 8A:
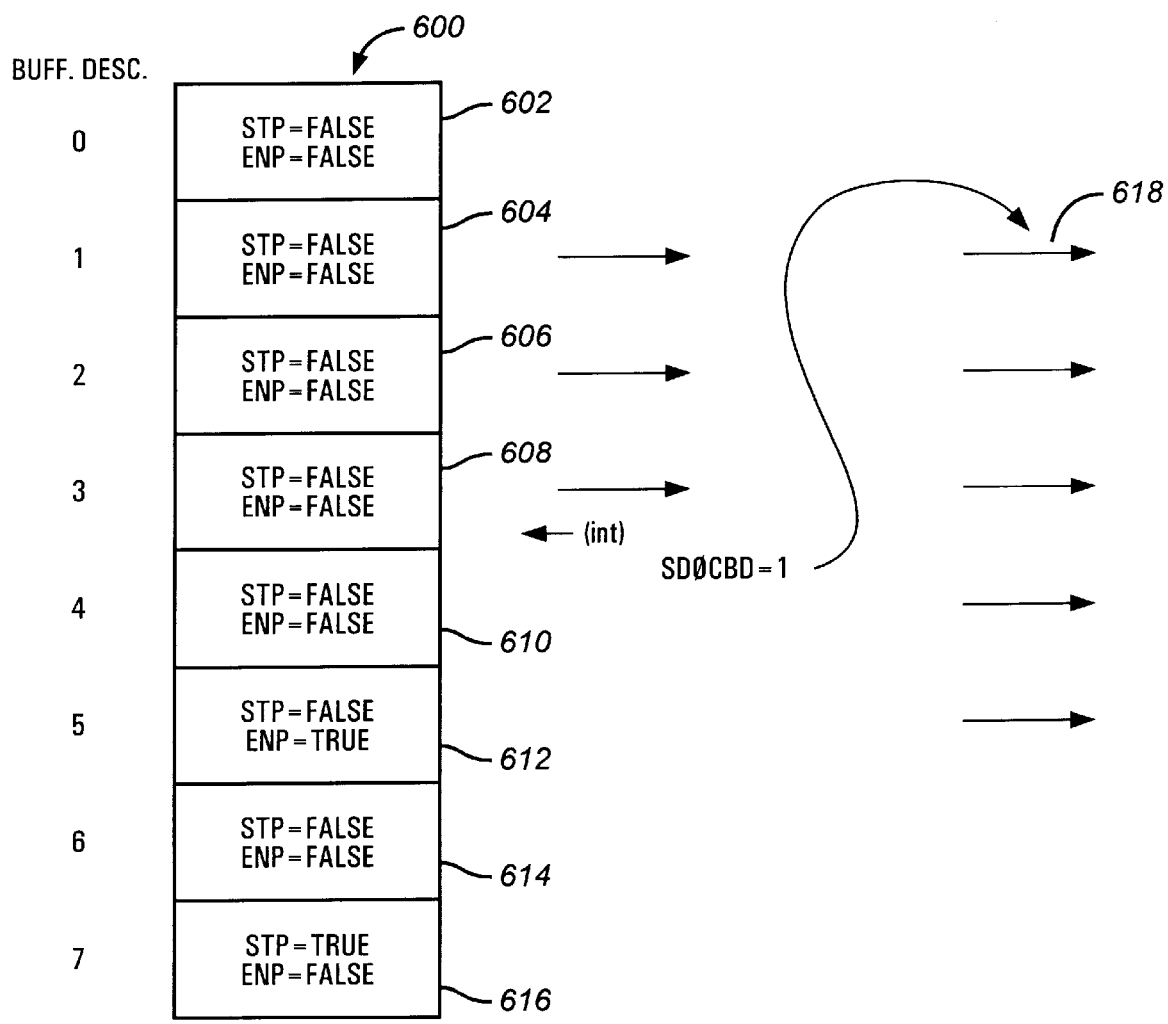
FIG. 8A is a memory diagram illustrating the packet retransmission capability of the buffer descriptor ring DMA unit according to the invention.
Figure 8B:
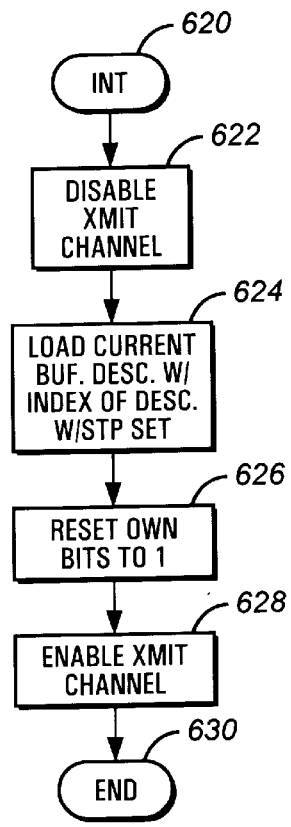
FIG. 8B is a flow chart illustration of an interrupt routine implemented in conjunction with FIG. 8A.

Turning to FIGS. 8A and 8B, illustrated is the restartable nature of the transmit buffer descriptor ring DMA according to the invention. Historically, when using buffer chaining DMA, if an error occurred in the middle buffer of a chain, the buffer descriptor ring DMA unit would simply advance to the start of the next packet and begin transmitting there. According to the invention, however, an error in the middle buffer of a chain does not necessarily result in the DMA unit 150 proceeding to the next packet. Instead, the software can restart the current packet. This is done by loading the current transmit buffer descriptor field CTBD 376 with the number of the buffer descriptor that is the start of the packet in which the error occurred.

As illustrated in FIG. 8A, a transmit buffer descriptor ring 600 includes 8 transmit buffer descriptors 602–616. These are numbered consecutively to be buffer descriptors 0 through 7 as reflected by the current transmit buffer descriptor field CTBD 376 number within the SD0CBD register 332.

Proceeding through the chain, the SmartDMA unit 150 skips the 0th buffer descriptor 602 and begins transmitting on the first buffer descriptor 604 because the start of packet bit STP 258 is set. It continues transmitting the current packet according to the second buffer descriptor 606, whose end of packet bit ENP 260 is false. This continues with the next buffer descriptor 608, but assume at this point the 4th buffer descriptor 610 has not yet had its ownership transferred from the software to the SmartDMA unit 150. An underflow interrupt can occur from the transmitting device to the transmit channel of the SmartDMA unit 150, which indicates an error condition during the DMA transfer.

In prior units, the DMA unit would simply proceed to the next packet, which here begins in the 7th buffer descriptor 616. Instead, according to the invention, when the error occurs after the transmission of the buffer corresponding to the 3rd buffer descriptor 608, the transmit channel is turned off by resetting the TXST bit 358 in the SD0CON register 320.

The software is then programmed to reload the current transmit buffer descriptor CTBD value 376 with the value of the buffer descriptor that is the start of the current packet. In this case, the first buffer descriptor 604 is the first buffer within this packet, so the software loads the CTBD value 376 with 1. The software should also "clean up" the buffer descriptor chain 600 to some extent, specifically by setting the ownership bits OWN 256 for each of the buffers within the failed packet to 1, so that the SmartDMA unit 150 will not halt and poll any of the buffer descriptors 604–608 when it is restarted. Then, the transmit channel is restarted by the software by setting the TXST bit 358 to true. Control then proceeds with a new transmission 618 of the 1st buffer within the failed packet from the transmit buffer associated with the first buffer descriptor 604.

By providing programmability of the current transmit buffer descriptors, the software is given the power to restart the transmission of the current packet. Further, the SD0CTAD register 334 provides the current transmit address within a particular buffer where a failure may have occurred. If an error occurs in the middle of a buffer 206, the software can even determine exactly where in a packet the transmission failed, and can determine whether to restart the packet or to proceed to the next packet based on the location of that failure.

Turning to FIG. 8B, illustrated is a flow chart of an interrupt routine 620 executed by the software upon the error that occurs during the transmit of a packet as illustrated in FIG. 8. Once an interrupt handler and the software had determined that the error was caused by a failure during the transmission of a packet, control proceeds to step 622, where the current transmit channel is disabled by setting the TXST bit 358 to 0. It is possible for the SmartDMA unit 150 to be designed to disable itself, but usually, such as an error indicated from another device, it may be desirable or necessary for the software to disable the particular transmit channel that has failed on the SmartDMA unit 150.

Proceeding to step 624, the current transmit buffer descriptor value CTBD 376 is then loaded by the software with the index of the first buffer in the current packet. Specifically, referring to FIG. 8A, this would be accomplished by loading a 1 into the current transmit buffer descriptor value CTBD 376. Proceeding to step 626, the software then sets the OWN bits for any buffers which have been transmitted and ownership relinquished to the software so that the SmartDMA unit 150 will retransmit them without polling. Specifically, the OWN bits of the first, second, and third buffer descriptors 604–608 of FIG. 8A should have been reset to 0 after they had been transmitted by the transmit channel of the SmartDMA unit 150, so they are set to 1.

Control then proceeds to step 630, where the software simply reenables the transmit channel by setting the TXST bit 358 within the control register SD0CON 320. This portion of the interrupt routine 620 then exits at step 630.

Therefore, by providing controlability of the current buffer being transmitted by the buffer chaining DMA unit, a current packet can be retransmitted when an error occurs during the transmission of that packet, rather than simply skipping the packet and proceeding to the next packet. This has the potential of reducing the number of packets that need to be retransmitted for error recovery.

Figure 9:
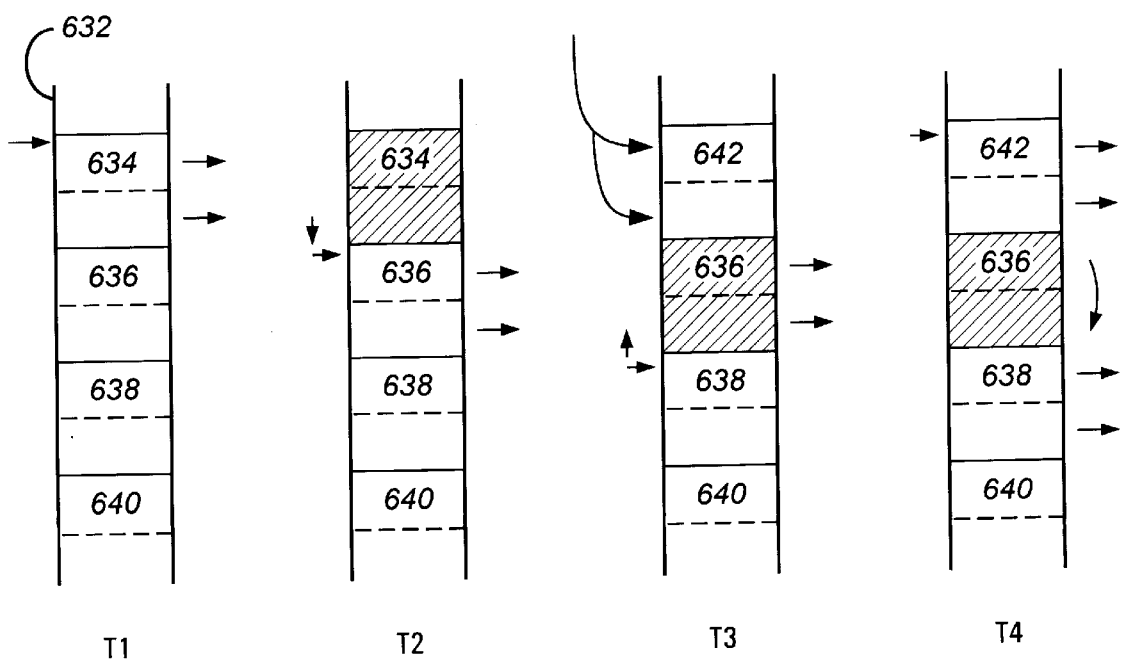
FIG. 9 is a memory diagram illustrating the use of the packet reset and retransmission capability of the buffer descriptor ring DMA unit according to the invention to insert high priority packets into the buffer descriptor ring DMA unit chain.

Turning to FIG. 9, illustrated is a memory diagram that shows another application of the ability to restart the SmartDMA unit 150 at a predetermined location. Here, a memory 632 contains four packets 634, 636, 638, and 640 that are each illustrated to contain two buffer descriptors pointing towards corresponding buffers. At a first time T1, the current transmit buffer descriptor CTBD field 376 is illustrated as pointing at the first packet 634. The SmartDMA unit 150 first transmits the two buffers associated with the first packet 634, leaving a situation as illustrated at time T2. At time T2, the two buffer descriptors that together form the packet 634 have been transmitted, so the OWN bit 256 in each of those buffer descriptors will be set to zero, indicating they are owned by the software. Further, the CTBD field 376 will now point to the second packet 636.

Assume the two buffers associated with the packet 636 are then transmitted. This yields time T3, when the CTBD field 376 now points to the third packet 638. Assume, however, that the execution unit 124 then needs to insert a new packet at the head of the buffer descriptor ring. Specifically, assume that a new, high priority packet, illustrated as a packet 642, should be transmitted before the packets 638 and 640. Therefore, the software inserts appropriate buffer descriptors for the packet 642 in front of the then currently transmitting packet 636. This is illustrated at time T3. Then, the software sets the current transmit buffer descriptor field CTBD 376 to point back to the packet 642. The start of packet bit STP is set in the first buffer descriptor of the packet 642, and the end of packet ENP is set in the second buffer descriptor of the packet 642. Because the packet 636 has been transmitted, the ownership bits OWN 256 for those buffer descriptors will currently grant ownership to the software. To prevent a SmartDMA unit 150 from "stalling" on the now transmitted packet 636, the software further sets the OWN bits 256 for the packet 636 so that the SmartDMA unit 150 will process those buffer descriptors. To prevent the packet 636 from being retransmitted, the STP bit 258 is reset in the first buffer descriptor of the packet 636, such that it will be ignored. The SmartDMA unit 150 is then restarted by the execution unit 124.

Proceeding to the time T4, this illustrates the operation once the SmartDMA unit 150 is restarted. The packet 642 is transmitted, and then the first buffer descriptor of the packet 636 is again read. Because the ownership bit OWN 256 is set, the SmartDMA unit 150 does not stall, but because the start of packet bit STP 258 has been reset, the SmartDMA unit 150 skips over the two buffer descriptors of the packet 636 and proceeds with transmitting the packet 638.

Therefore, the controllable current buffer descriptor field of the SmartDMA unit 150 allows higher priority packets to be inserted in the current stream of packets being transmitted.

Staggered Descriptor Polling

A channel of the SmartDMA unit 150 can be "active" without transmitting or receiving any data. Further, a channel of the SmartDMA unit may even need to transmit or send data, but be unable to access a buffer 206 because the software presently owns the buffer through the ownership flag OWN 256 of the corresponding buffer descriptor 208. In either case, the SmartDMA unit 150 periodically polls the OWN bit 256 of the current buffer descriptor for that particular channel. This can cause a bandwidth and latency problem, especially when two channels simultaneously become active.

Figure 10:
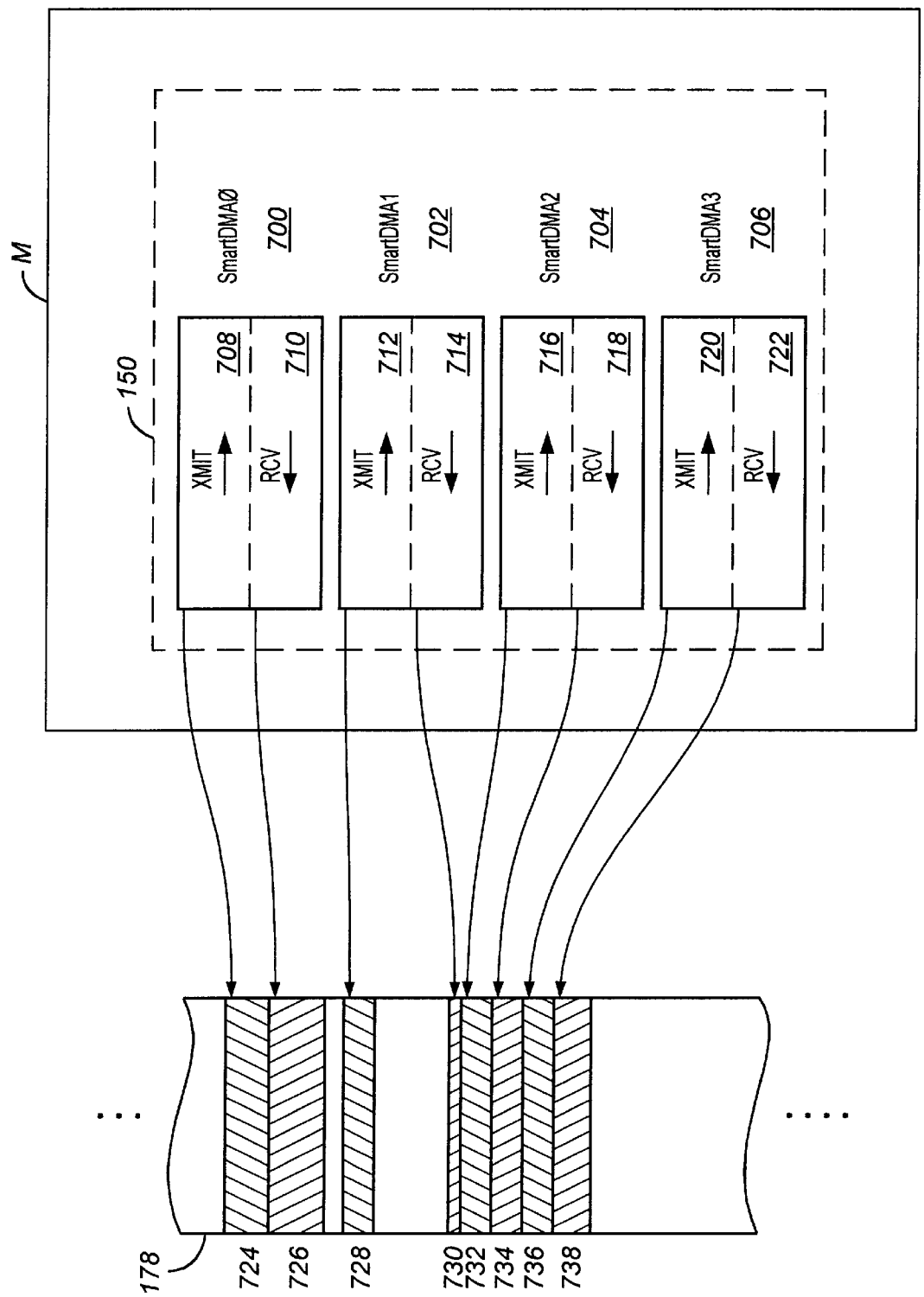
FIG. 10 is a memory diagram and block diagram illustrating the multiple channels of the buffer descriptor ring DMA unit according to the invention.

For a better understanding, FIG. 10 illustrates four pairs of SmartDMA channels that can encounter this problem according to the invention. Specifically, four SmartDMA channel pairs SmartDMA0 700, SmartDMA1 702, SmartDMA2 704, and SmartDMA3 706 each have an associated pair of transmit and receive channels 708–722. As previously discussed, each of these channels has an associated buffer descriptor ring in memory 178, here illustrated as blocks of memory 724–738. Further, each of the buffer descriptor rings 724–738 has a current buffer descriptor designated to by the current receive buffer descriptor field CRBD 374 or the current transmit buffer descriptor field CTBD 376 (for the SmartDMA 0 700) and corresponding variables associated with each of the other three channel pairs. Assume for purposes of illustration that all of the transmit and receive channels are enabled, but idle. For the transmit channels 708, 712, 716, and 720, this would mean that the current buffer descriptor and the associated blocks of memory have their OWN bit 256 set to 0, indicating the software owns the current buffer descriptor because it has not yet established an associated buffer for transmission of data. For the receive channels 710, 714, 718, and 722, typically an idle channel would have the current buffer descriptor owned by the SmartDMA unit 150, because the need to access the associated receive buffer is driven by the source of external data, as opposed to by the availability of data within the buffer itself. Assume for illustrative purposes, however, that received data is being provided on the four received channels 710, 714, 718, and 722, but that the software still owns the associated buffer descriptor within the memory 178. Although this is a worse case illustration, the problem occurs even if only the transmit channels are currently waiting on an available buffer, and even if only two of the transmit channels are waiting on an available buffer.

Figure 11:
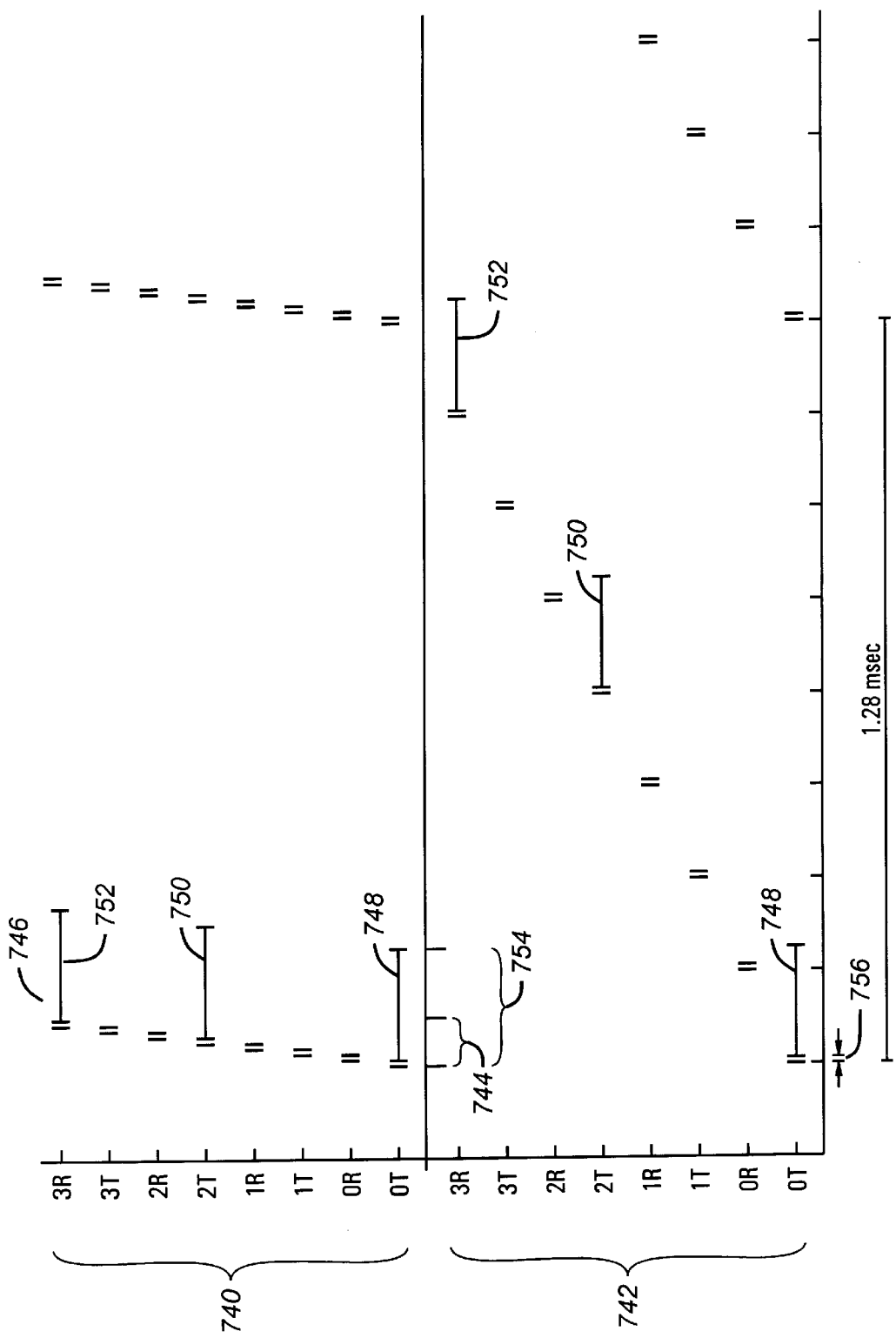
FIG. 11 is a timing illustration of the staggered descriptor polling according to the invention.

The problem that arises is that it takes bandwidth on the bus 100, as well as bandwidth to the memory 178, to poll the OWN bits 256 of buffer descriptors within the memory 178. Therefore, they are not continuously polled, but instead polled at predetermined intervals. Turning to FIG. 11, illustrated are two polling techniques, one polling technique 740 which has been historically employed, and a second polling technique 742 according to the invention. In the diagram associated with the technique 740, the buffer descriptors in the memory 178 are polled approximately every 1.28 milliseconds (or any other predetermined period), but they are all polled at once. Specifically, every 1.28 milliseconds, prior buffer chaining DMA engines would have checked the channel 0 transmit descriptor, the channel 0 receive descriptor, the channel 1 transmit descriptor, the channel 1 receive descriptor, and so on, contiguously, for each of the transmit or receive channel that was awaiting an available buffer in the memory 178. This caused, however, increased bandwidth usage and interrupt latency since in a worse case, eight contiguous polls would occur in a row occupying a time 744. Because interrupts have lower priority than DMA, this would lead to an interrupt latency of eight times that that would occur in a single poll.

Second, however, assume that on a particular poll 746, three buffers became available for DMA that was needed, here illustrated in a time period 748, 750, and 752. This would cause three of the channels to begin performing DMA, which could occupy virtually all of the bandwidth on the bus 100 and a great deal of the bandwidth to the memory 178. Further, worse case interrupt latency becomes very poor if all of the bus bandwidth is occupied, since there will be no time for interrupts during a period 754.

It should be understood that generally, DMA transfers on a single channel, such as the transfer 748, do not occupy all of the bandwidth of the memory 178 or a bus 100. An external device is periodically requesting for an additional data, leaving idle times during which interrupts can be serviced or other bus activity can take place. But when a number of DMA transfers are simultaneously occurring, these can occupy all available bandwidth. Because DMA typically has a higher priority than interrupts, interrupt latency then becomes very poor.

According to the invention as illustrated in the technique of 742, these latency and bandwidth problems are largely alleviated by staggering the polling of the descriptors associated with each of the DMA channels 708–722. According to the technique 742, the same three DMA transfers 748, 750, and 752 occur, but they are now distributed in time and do not overlap, thereby alleviating bandwidth crowding. Further, by staggering the descriptor polling, the latency for a particular poll is limited to the amount of time it takes for a single descriptor poll as illustrated by the time period 756, instead of a cumulative amount for the number of channels that have to be polled, as illustrated by the time period 744. The polls are distributed throughout the 1.28 millisecond time period in which all the polls occur. The poll of the SmartDMA0 700 transmit channel 708 results in the first DMA transfer 748, but then when the SmartDMA 2 704 transmit channel 716 is polled approximately 0.64 milliseconds later, the DMA transfer 750 does not overlap with the DMA transfer 748. The same occurs for the SmartDMA 3 706 receive channel 722, where the DMA 752 does not overlap with either the DMA 748 or 750.

Therefore, distributing descriptor polling, whatever the duty cycle of a complete polling cycle, improves interrupt latency both by avoiding multiple consecutive descriptor polls and by reducing overlap of DMA transfers and corresponding bandwidth crowding.

Figure 12:
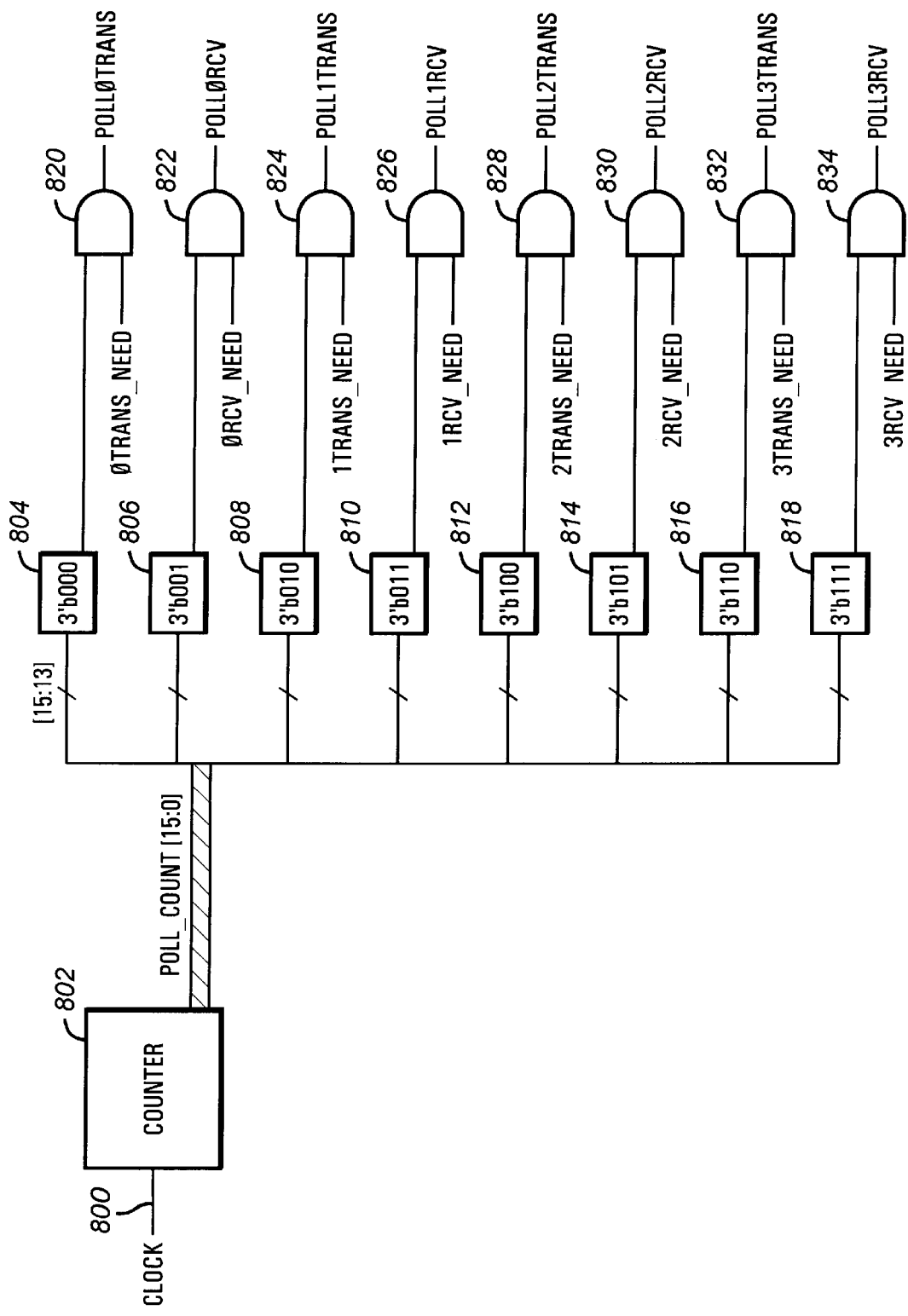
FIG. 12 is a schematic illustration of circuitry for implementing the staggered descriptor polling of FIG. 11.

Turning to FIG. 12, illustrated is a simple circuit diagram of how a single timer/counter can be used to distribute the descriptor polling. A system clock input 800 continuously drives a counter 802, which in this embodiment is a 16-bit counter that outputs a continuous count POLL_COUNT [15:0]. The top 3 bits of POLL_COUNT [15:13] are then provided to a series of eight comparator 804–818. Each of these comparators 804–818 compares to a successive 3 bit value, with the comparator 804 matching to a value 3'b000, and the comparator 806 matching to 3'b001, and so on through the comparator 818, which matches to 3'b111. The outputs of these comparators are provided to a series of AND gates 820–834. The other input of the AND gates 820–834 receive a signal which reflects whether a corresponding transmit or receive channel 708–722 is awaiting ownership of a buffer descriptor within the memory 178. The output of the AND gates 820–834 are signals provided to the remainder of the SmartDMA unit 150, which provides a pulse indicating it is now time to poll the ownership OWN of the buffer descriptor corresponding to the channel 708–722. Referring to the AND gate 820, for example, if the transmit channel 708 is neither enabled or not awaiting availability of a buffer, 0TRANS_NEED will be 0, indicating that transmit channel 0 is not in need of a poll. If it is in need of a poll, however, the 0TRANS_NEED signal will be true, and when POLL_COUNT [15:13] equals 3'b000, a pulse is provided on the POLL0TRANS signal, whose rising edge indicates that a poll is necessary using the current buffer descriptor in the memory area 724.

Similarly, when POLL_COUNT [15:13] equals 3'b001, the output of the comparitor 806 becomes true, so if the receive channel 710 is in need of a poll, the output of the AND gate 822 will go true, and the rising edge of POLL0RCV will indicate that it is then time to poll the ownership of the current buffer descriptor in the buffer descriptor ring located in the memory area 726. In this way, the eight available channels are distributed throughout a complete polling period.

Of course, a variety of other techniques can be used to distribute the polling throughout a polling period, and the distribution need not be linear. But by reducing the overlap when buffers simultaneously become available, and reducing the occurrence of consecutive polls, interrupt latency is reduced and bandwidth availability is increased.

Of note, it is generally not necessary for a single DMA channel pairs read and write channels to be staggered from each other. A read channel will rarely be in a mode where the DMA channel is periodically polling the ownership flag in the receive buffer descriptor, so to have such a poll occur at or near the same time as the poll of the transmit buffer descriptor generally will not include latency, since such a poll will rarely occur.

The foregoing disclosure and description of the invention are illustrative and explanatory thereof, and various changes in the number of bits, number of signals, order of steps, field sizes, connections, components, and materials, as well as in the details of the illustrated hardware and construction and method of operation may be made without departing from the spirit of the invention.

What is claimed is:

1. A microcontroller implemented as a single monolithic integrated circuit, comprising:

an execution unit for executing instructions; and a buffer descriptor ring direct memory access (DMA) controller coupled to the execution unit, comprising:

a plurality of buffer descriptor ring DMA channels, the buffer descriptor ring DMA channels when idle periodically polling a current buffer descriptor within a memory to determine whether ownership of the current buffer descriptor has been transferred to the DMA channel; and a staggered polling circuit coupled to the buffer descriptor ring DMA channels that caused the DMA channel to poll memory when awaiting ownership of a buffer descriptor, the staggered polling circuit distributing such polls among the channels throughout a polling interval rather than contiguously.

2. The microcontroller of claim 1, wherein the polling interval is 1.28 milliseconds.

3. The microcontroller of claim 2, wherein the staggered polling circuit uniformly distributes the polls.

4. The microcontroller of claim 1, wherein the buffer descriptor ring DMA controller further comprises:

a forced poll indicator that causes a DMA channel to immediately poll its current descriptor for ownership of the current buffer descriptor.

5. The microcontroller of claim 1, wherein the staggered polling circuit further comprises:

a 16-bit counter that continuously runs; and a plurality of comparators, one for each DMA channel, the plurality of comparators coupled to predetermined bits within the counter and providing a true value when the bits equal a predetermined value, wherein the plurality of comparators provide outputs indicating that it is time for a corresponding DMA channel to perform a poll.

6. The microcontroller of claim 1, wherein the staggered polling circuit staggers the polls of at least two transmit channels from each other.

7. The micrcontroller of claim 1, wherein the staggered polling circuit staggers both receive and transmit channels from each other.

8. A buffer descriptor ring direct memory access (DMA) controller, comprising:

a plurality of buffer descriptor ring DMA channels, the buffer descriptor ring DMA channels when idle periodically polling a current buffer descriptor within a memory to determine whether ownership of the current buffer descriptor has been transferred to the DMA channel; and a staggered polling circuit coupled to the buffer descriptor ring DMA channels that causes the DMA channel to poll memory when awaiting ownership of a buffer descriptor, the staggered polling circuit distributing such polls among the channels throughout a polling interval rather than contiguously.

9. The buffer descriptor ring DMA controller of claim 8, wherein the polling interval is 1.28 milliseconds.

10. The buffer descriptor ring DMA controller of claim 8, wherein the staggered polling circuit uniformly distributes the polls.

11. The buffer descriptor ring DMA controller of claim 8, wherein the buffer descriptor ring DMA controller further comprises:

a forced poll indicator that causes a DMA channel to immediately poll its current descriptor for ownership of the current buffer descriptor.

12. The buffer descriptor ring DMA controller of claim 8, wherein the staggered polling circuit further comprises:

a 16-bit counter that continuously runs; and a plurality of comparators, one for each DMA channel, the plurality of comparators coupled to predetermined bits within the counter and providing a true value when the bits equal a predetermined value, wherein the plurality of comparators provide outputs indicating that it is time for a corresponding DMA channel to perform a poll.

13. The buffer descriptor ring DMA controller of claim 8, wherein the staggered polling circuit staggers the polls of at least two transmit channels from each other.

14. The buffer descriptor ring DMA controller of claim 8, wherein the staggered polling circuit staggers both receive and transmit channels from each other.

15. A method of polling in a buffer descriptor ring direct memory access controller, comprising the steps of:

providing a polling interval;

providing a plurality of buffer descriptor ring DMA channels that when awaiting a buffer from memory poll a current buffer descriptor for ownership of the buffer in memory; and distributing the polling of the channels throughout the polling interval.

16. The method of claim 15, the distributing step comprising the steps of:

comparing a plurality of comparator values for the plurality of buffer descriptor ring DMA channels to a continuous count; and providing a plurality of comparator output signals with true values indicating the different times in the polling interval in response to the comparing step when each of the plurality of buffer descriptor ring DMA channels is to perform a poll.

* * * * *